US005997683A

United States Patent [19]

Popat

[11] Patent Number: 5,997,683

[45] Date of Patent: Dec. 7, 1999

[54] METHOD OF PRINTING A DIVISIBLE LASER LABEL SHEET

[75] Inventor: Ghanshyam H. Popat, Alta Loma, Calif.

[73] Assignee: Avery Dennison Corporation, Pasadena, Calif.

[21] Appl. No.: 08/343,023

[22] Filed: Nov. 21, 1994

Related U.S. Application Data

[63] Continuation-in-part of application No. 08/063,213, May 17, 1993, Pat. No. 5,389,414.

[51] Int. Cl.$^6$ .................................................... B32B 31/00

[52] U.S. Cl. .......................... 156/277; 156/253; 156/268; 428/43

[58] Field of Search .................................... 156/248, 268, 156/252, 253, 277; 283/101, 103, 105, 109, 117; 428/43; 229/75

[56] References Cited

U.S. PATENT DOCUMENTS

| | | | |
|---|---|---|---|
| 2,304,787 | 12/1942 | Avery | 156/268 X |
| 3,993,814 | 11/1976 | Cavender . | |
| 4,033,611 | 7/1977 | Johnsen . | |
| 4,515,077 | 5/1985 | Davidson et al. . | |
| 4,637,635 | 1/1987 | Levine . | |
| 4,814,216 | 3/1989 | Brunett et al. . | |
| 4,878,613 | 11/1989 | Badger et al. | 229/75 |
| 4,952,433 | 8/1990 | Texuka . | |
| 5,033,252 | 7/1991 | Carter . | |
| 5,090,733 | 2/1992 | Bussiere . | |
| 5,129,682 | 7/1992 | Ashby . | |
| 5,132,915 | 7/1992 | Goodman . | |
| 5,139,836 | 8/1992 | Burke . | |
| 5,147,699 | 9/1992 | Browning et al. . | |
| 5,182,152 | 1/1993 | Ericson . | |
| 5,200,242 | 4/1993 | Hohmann . | |
| 5,209,514 | 5/1993 | Hebert . | |
| 5,227,209 | 7/1993 | Garland . | |
| 5,382,055 | 1/1995 | Mertens et al. | |

OTHER PUBLICATIONS

Avery "Laser Name Badge Labels," Avery Product Code 5895, With Photocopy Of Packaging for the Labels ©1991.

Avery "Laser Name Badge Labels," Avery Product Code 5095, With Photocopy Of Packaging For The Labels ©1991 And With Booklet Entitled "Using Avery Name Badge Laser Labels" ©1991.

Avery "Laser VideoTape Labels," Avery Product Code 5199, With Photocopy Of Packaging For The Labels ©1993.

Avery "VideoTape Laser Labels," Avery Product Code 5199, With Photocopy Of Packaging For The Labels ©1990.

Avery "Laser Labels," Avery Product Code 5160, First Sold In 1986.

Avery "Laser Labels," Avery Product Code 5163, Sold At Least As Early As 1990.

Continental DataForms 1991 Distributor Net Price List.

Avery Laser Run Product Literature, Published Prior To 1992.

*Primary Examiner*—Curtis Mayes
*Attorney, Agent, or Firm*—Oppenheimer Wolff & Donnelly LLP

[57] ABSTRACT

A versatile label preparation method includes preparing double thickness label sheet assemblies. Each sheet assembly has a divisible backing sheet and a divisible label sheet. The label sheet is coated with a pressure sensitive adhesive and is mounted on the backing sheet. The label sheet assembly is divided into a plurality of sections by lines of microperforations extending through both the label sheet and the backing sheet. Each of the sections has a plurality of die cut labels thereon. The die cuts extend through the label sheet but not through the backing sheet. Each of said sections of the label sheet assembly have a line of flexibility along one edge thereof for facilitating feeding through a laser printer. A user divides the sheet into sections, with each section including at least one label on the backing sheet. The user adjusts the feeding mechanism on a laser printer to the width of the section sheets of labels and prints the labels on the sections of the label sheet assembly. A method for printing cards includes forming and printing a sheet of card stock which is divided into subsections by lines of microperforations. Each subsection includes a closed pattern of microperforations defining a removable card.

15 Claims, 4 Drawing Sheets

FIG. 6
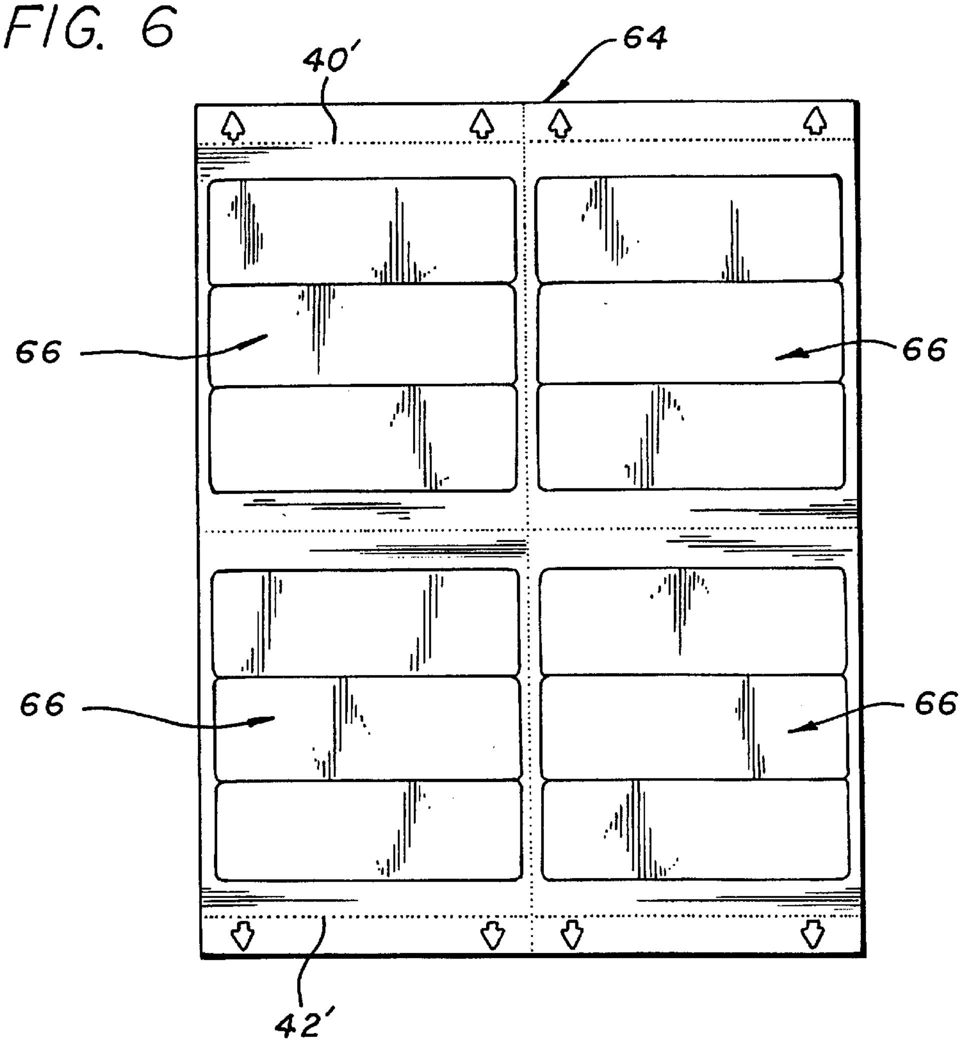
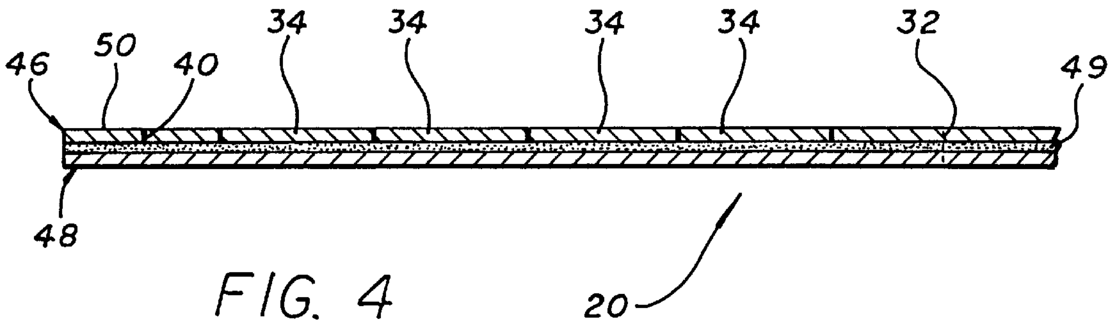
FIG. 4

FIG. 7
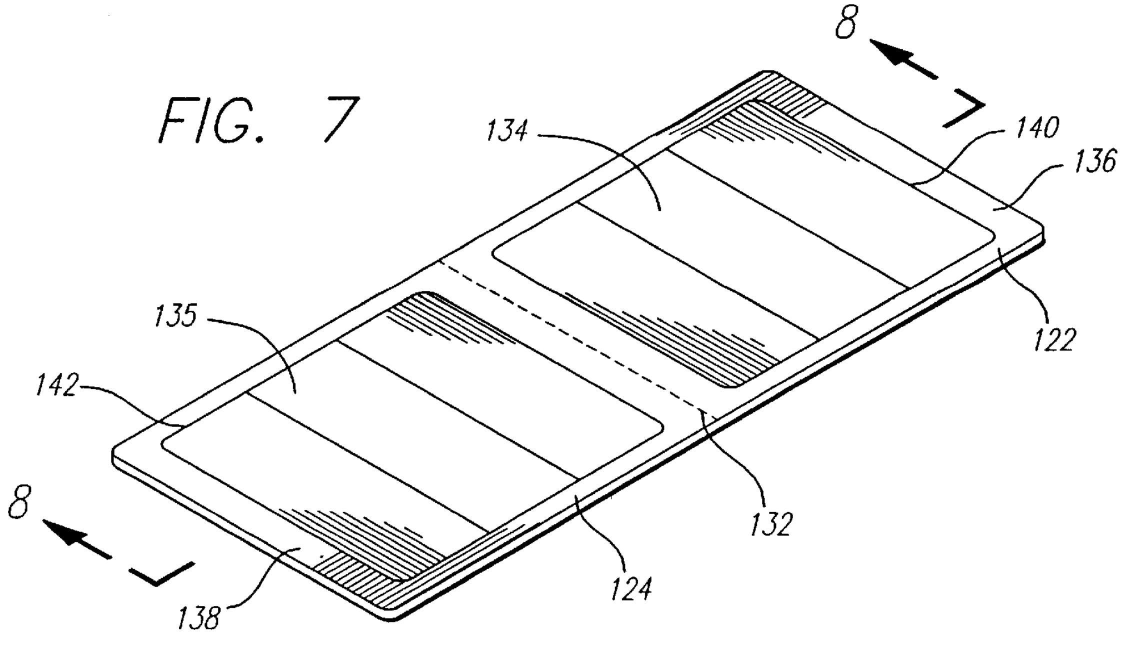
FIG. 8
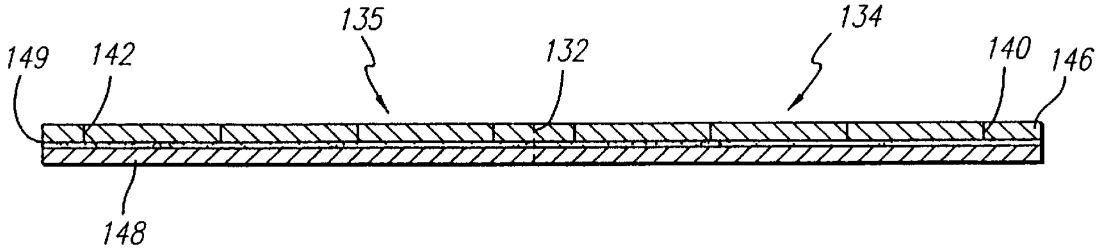
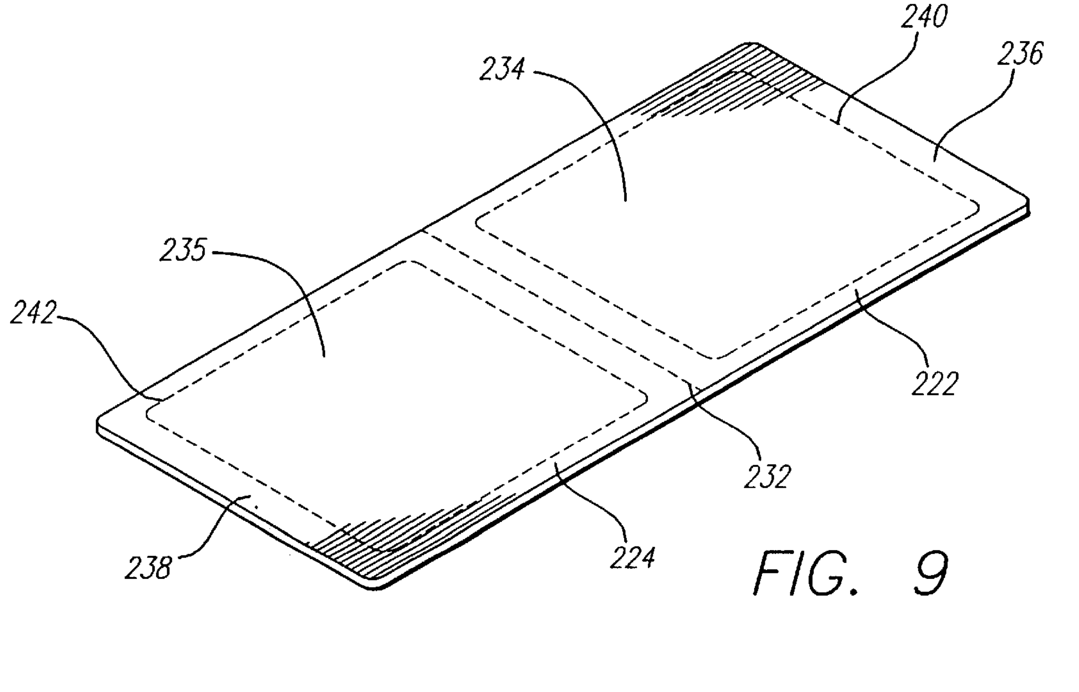
FIG. 9

METHOD OF PRINTING A DIVISIBLE LASER LABEL SHEET

CROSS-REFERENCE TO RELATED APPLICATION

This application is a continuation-in-part of U.S. Patent application Ser. No. 08/063,213, filed May 17, 1993, now U.S. Pat. No. 5,389,419 and entitled DIVISIBLE LASER LABEL SHEET.

FIELD OF THE INVENTION

The present invention relates generally to a multiple purpose, sheet assembly that may be divided into subsections and to a method for printing the subsections in laser printers, ink jet printers and photocopiers.

BACKGROUND OF THE INVENTION

Laser printers and ink jet printers have spawned a wide variety of options for personal printing that have not existed previously. A personal computer user can now prepare text on a word processing program and print the text directly onto sheets that pass through the laser or ink jet printer. Such sheets may consist of labels applied to a backing sheet, or may be made of card stock for cutting into business cards. The sheets are typically 8½×11 inches in dimension and may be fed into the laser or ink jet printer through a standard paper tray.

With experience, users have encountered difficulties with full-sized sheets of labels. The sheets typically cannot be run through a laser printer more than once because excess toner tends to build up on the blank areas of the sheet. Furthermore, the complex paper path that the sheet must follow tends to distort the desired flat surface of the sheet on subsequent passes through the printer, particularly if some labels have been removed. Consequently, if only a small number of labels are to be printed, the rest of the labels are wasted and the user ends up paying for labels that are never used.

With the introduction of adjustable manual feed guides such as those found on the Hewlett Packard LaserJet II, III and IV laser printers and other printers, users may now print on envelopes or other sheets smaller than the typical 8½×11 inch full sheet size. For example, many laser printers may print sheets that are as small as 5 inches long and 3 inches wide. However, to print a smaller number of labels than those provided on a full-sized sheet, a user would have to manually cut the full-sized sheet down to size.

SUMMARY OF THE INVENTION

Broadly considered, a versatile label preparation method may have several steps. A double thickness label sheet assembly may be prepared in which the assembly has a divisible backing sheet and a divisible label sheet. The label sheet has a pressure-sensitive adhesive coating, and is mounted on the backing sheet with the adhesive facing the backing sheet. The double thickness label sheet assembly is divided into at least two sections by perforations which extend through both the label sheet and the backing sheet. Each of the sections has at least one label thereon. The method further includes the step of separating at least one of the sections from the assembly. The label on the section of the label sheet assembly is printed in a laser printer, ink jet printer, or photocopier.

The present invention is helpful in overcoming the shortcomings of the prior art in a number of ways. The versatile label preparation method provides a sub-dividable label assembly which gives the user the choice of printing a full sheet, or to print a smaller section of a full sheet when printing on a smaller area is desired. The method is environmentally efficient in that a small number of labels or cards may be printed without having to dispose of extra, unused labels or cards. Certain embodiments of the present invention may include a temperature stable adhesive which can withstand the high-heat environment of a laser printer. The method may be applied to a variety of assemblies having different sheet sizes, including smaller sheets which can be efficiently stored in a desk drawer or on a small shelf. Additionally, the present method for preparing small sets of labels and/or cards is convenient for anyone having access to a personal computer and a laser printer, ink jet printer, photocopier, or other advanced printer.

In one preferred embodiment of the method, each of the subsections is between approximately 3 and 5 inches wide by between approximately 4 and 6 inches long, in order to meet the minimum width and length requirements of laser and ink jet printers. In this embodiment, a label assembly having two sections would be between approximately 3 and 5 inches wide by between approximately 8 and 12 inches long.

The method may further include the step of cutting flexibility lines and leading edge portions of each of the sections. The flexibility lines penetrate partially into the double thickness sheet, thereby increasing the flexibility of the assembly and reducing the possibility that the assembly will jam in the complex printer path of a laser printer, ink jet printer, photocopier, or other printer. The step of cutting flexibility lines may include cutting the flexibility lines approximately ½-inch from the leading edges of each section so that each section has a flexible leading portion of some width. The flexibility line or lines may constitute or comprise an edge of a label.

Considering one embodiment of the present invention in more detail, a method for handling small size sheets may include forming a sheet assembly approximately at least 3 inches by at least approximately 10 inches. The sheet assembly has an upper sheet with pressure-sensitive adhesive on at least a portion of the rear side thereof, and also having a second sheet at least covering the pressure-sensitive adhesive. The line of perforations is formed across the sheet assembly to divide the sheets into at least two subsheets, each at least approximately 3 inches wide by at least approximately 5 inches long, with the perforations extending through both the upper and second sheet. The sheet assembly is separated along the line of perforations into two subsheets. Information is printed on the upper sheet by feeding at least one of the subsheets through a printer. The second sheet that covers the pressure-adhesive on one of the subsheets is removed. The pressure-sensitive adhesive and the upper sheet are applied to a substrate.

This method may be supplemented in a variety of ways. The method may further include the step of cutting the upper sheet into two or more labels. The perforations may be microperforations, having at least 35 cuts and ties per inch. The assembly may be made to be substantially flat and substantially free of apertures, such as tractor feed holes found on sheets printed on dot matrix printers. The method may include the step of dividing the assembly into two identical halves by the line of perforations, with the line of perforations being a line of symmetry. The step of printing information on the upper sheet by feeding at least one of the subsheets through a printer may further include adjusting printer feed guides to a width approximately equal to that of one of the subsheets. The upper sheet may be formed of substantially transparent paper or transparent film so that the color and/or texture of a substrate may be viewed through the upper sheet. Adhesive which is stable up to at least 200° C. for at least 0.1 seconds may be used to prevent the adhesive from oozing out of the label assembly in the high-heat environment of a laser or xerographic printer.

Embodiments of the present invention may be formed with limitations on the thickness, such as 12 mils of 15 mils. Such thickness limitations are intended to insure that the present label assemblies are sufficiently thin to pass through current laser printers, ink jet printers, and photocopiers.

Embodiments of the present invention extend to a method for printing cards on small sized sheets. The method includes forming a sheet assembly at least approximately 3 inches wide by at least approximately 10 inches long, with the sheet assembly being approximately 15 mils or less thick. A line of perforations is formed across the sheet assembly to divide the assembly into at least two subsheets, each at least approximately 3 inches wide by at least approximately 5 inches long. Individual printable areas are formed on each of the two sheets by closed patterns of microperforations. At least one subsheet is separated from this sheet assembly. Information is printed on a printable area of one of the subsheets by feeding the subsheet through a printer. An individual printable area is removed from the sheet assembly.

Considering additional embodiments of the method for printing cards, the assembly may further include at least one lamination strip. The method may further include the steps of removing the lamination strip from the assembly. The individual printable area may be laminated with the lamination strip. The lamination strip and printable area together may be a variety of different types of laminated cards, such as identification cards, hanging file tabs, or self-adhering index tabs. The method may further include the step of forming lines of perforations for flexibility, with each of the subsheets having a line of perforations inset approximately ½-inch from an inch thereof. These lines of perforations for flexibility may constitute or comprise one edge of a removable principal area.

Other objects, features, and advantages of the invention will become apparent from a consideration of the following detailed description and the accompanying figures.

BRIEF DESCRIPTION OF THE DRAWINGS

FIG. 4 is a sectional view taken along section 4—4 of FIG. 1 showing the die cut labels adhering to an underlying backing sheet;

FIG. 6 is a top perspective view showing a full-sized sheet having separable sections each having three labels;

FIG. 7 is a top perspective view of a smaller embodiment of a divisible label sheet assembly;

FIG. 8 is a sectional view taken about Line 8—8 of FIG. 7; and

FIG. 9 is a top perspective view of a divisible sheet having closed patterns of perforations defining removable cards.

DETAILED DESCRIPTION OF THE PREFERRED EMBODIMENTS

Figure 1:
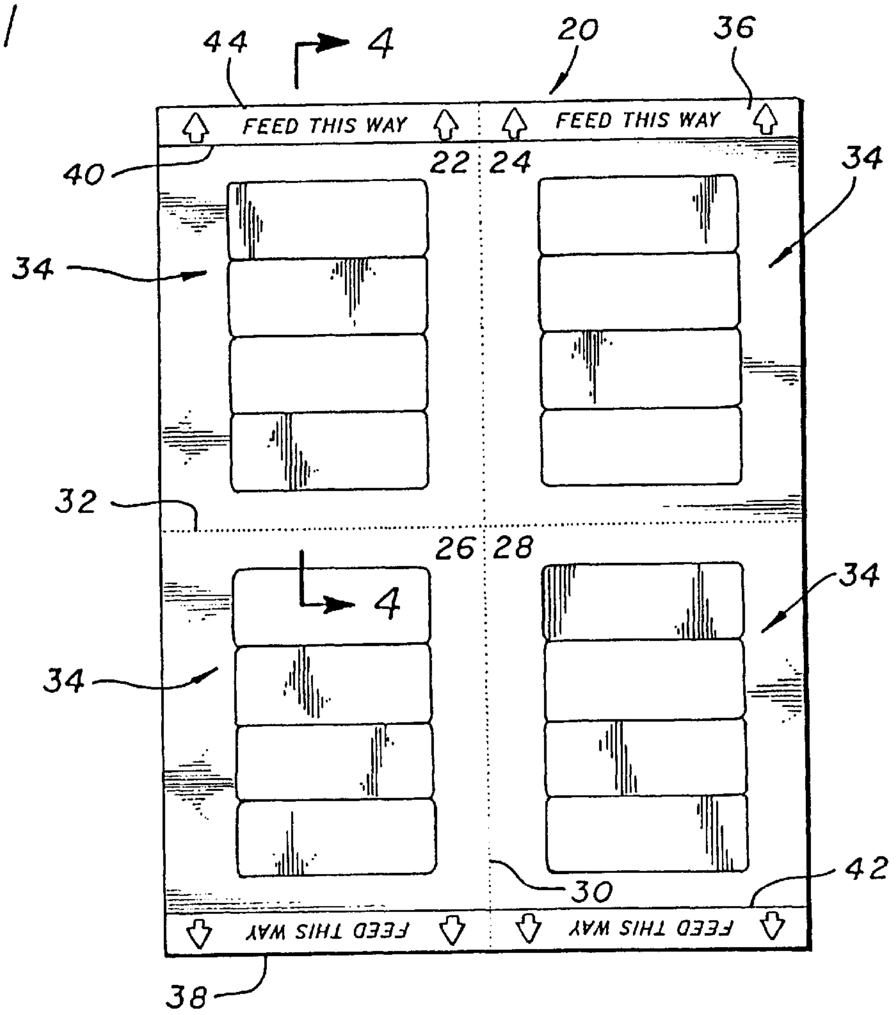
FIG. 1 is a top perspective view showing a full-sized label sheet having four separable sections each having four labels.

Referring more particularly to the drawings, FIG. 1 illustrates an embodiment of a double thickness label sheet assembly. The label sheet 20 is divided into four subsections 22, 24, 26, and 28, which are separated by perpendicular lines of microperforations 30 and 32. Each subsection includes a set of labels 34 that is generally centered within the subsection. Leading edge portions 36 and 38 comprise die cut flexibility lines 40 and 42, and indicia 44 to indicate the proper direction for feeding a label subsection into a laser printer, such as that illustrated in FIG. 2. "Leading edge" refers to that edge which is fed into the printer first.

FIG. 4 is a cross-sectional view of subsection 22 taken along section 4—4 of FIG. 1. FIG. 4 shows that the label assembly 20 includes a label layer 46 which is mounted on a backing layer 48. The label sheet has a pressure sensitive adhesive coating 49 which allows the label sheet to mount onto the backing layer 48, which has a silicone release coating to permit a user to remove labels from the backing layer. The release coating may alternatively be fluorinated or amine-based rather than silicone, or may be any other suitable coating.

*The Hewlett Packard LaserJet* 4 *and* 4*M Printers User's Manual*, Second Edition, March 1993, specifies that materials inserted into the printer must be stable in the presence of temperatures up to about 200° C. for at least 0.1 second to withstand the significant heat encountered in the printers' fusing process. Consequently, the adhesive of embodiments of the present invention may be selected to be temperature stable to a temperature of 200° C. for at least 0.1 second for these types of laser printer. Such an adhesive may be the P09 acrylic adhesive sold by Avery Dennison Corporation, or a rubber based adhesive of styrene butadiene and ABA block copolymers compounded with tackifying resins. However, it is important to note that any suitable stable, pressure sensitive adhesive may be used which facilitates printing at high temperatures and peeling the labels from the backing layer 48.

FIG. 4 also shows that flexibility line 40 is die cut through label layer 46, but not through backing sheet 48. The purpose of the flexibility line is to allow the leading edge 50 to easily bend around the various twists and turns in a conventional laser printer feed path. Consequently, flexibility line 40 has the effect of avoiding paper jamming which may occur with sheets having more rigid leading edges.

Label set 34 is die cut out of the label layer 46. As seen in FIG. 4, the die cuts pass through the label layer but not the backing layer. Thus, the backing layer is left intact when the labels are removed.

FIG. 4 also shows perforation line 32, which separates subsection 22 from subsection 26. The perforation line 32 passes through both label layer 46 and backing layer 48, so that subsection 22 can be completely separated from subsection 26. The perforations are preferably closely spaced "microperforations" which leave a relatively smooth edge when the subsections are separated. "Microperforations" generally have at least thirty five cuts per inch, although many more cuts per inch may be used. It should be understood, however, that the term "microperforations" is intended to encompass all constructions in which the edges of the backing sheet are smooth and substantially free of coarse irregularities following separation.

Figure 2:
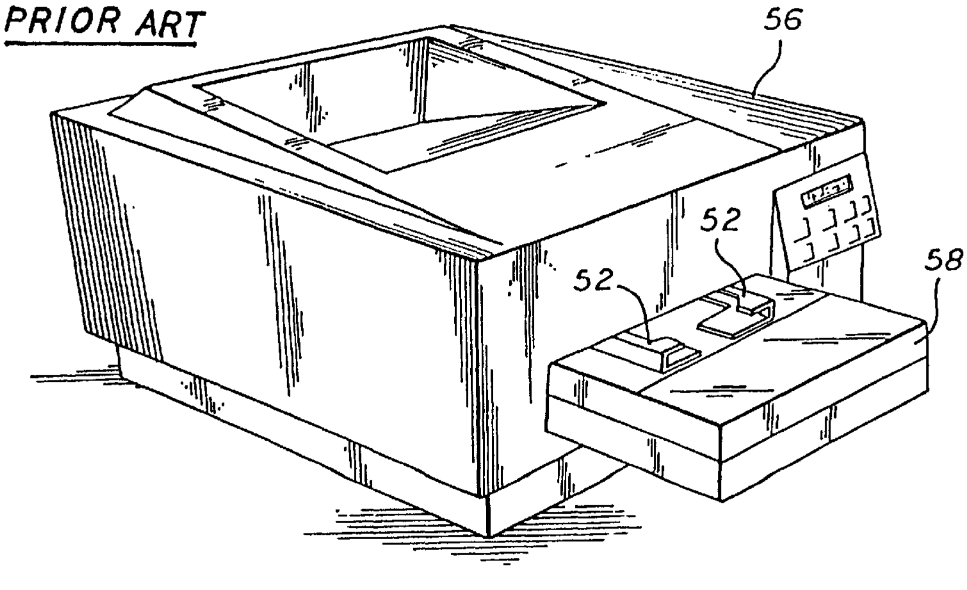
FIG. 2 PRIOR ART
FIG. 2 is a perspective view of a conventional laser printer having adjustable sheet guides for printing sheets having dimensions less than standard sheet size.
Figure 3:
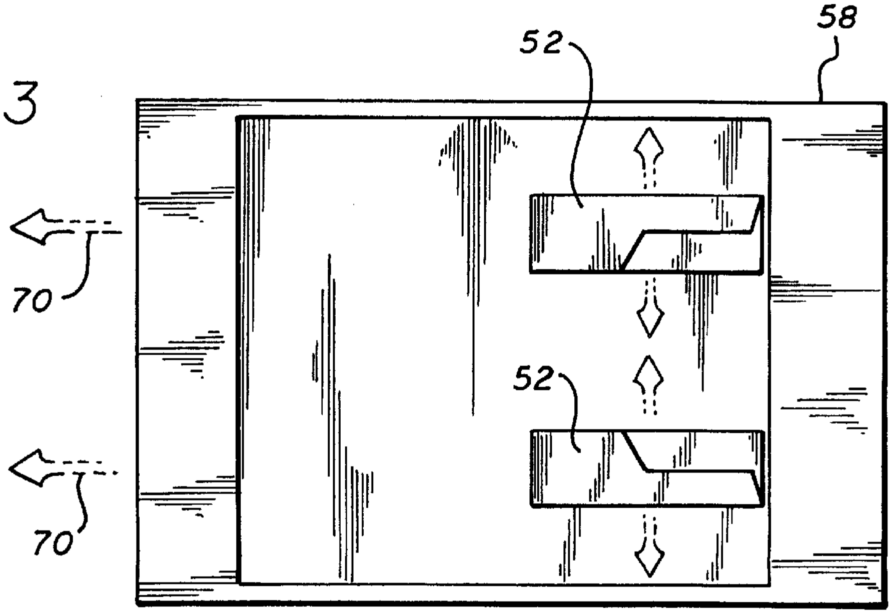
FIG. 3 is a top perspective view of a laser printer paper tray having adjustable manual feed guides which a user (an adjust to accommodate a section of labels having dimensions less than 8½x11 inches.

FIG. 2 illustrates a typical laser printer 56 having a paper tray 58. Full sized sheets of paper or labels may be stored inside the paper tray for automatic feeding into the laser printer. Alternatively, paper or label sheets may be fed into the printer manually at adjustable manual feed guides 52, which are shown more clearly in FIG. 3. A user may adjust these guides to input sheets of various widths into the laser printer for printing. Consequently, a user can adjust the feed guides in order to input a subsection of label sheet 20 for printing. Arrows 70 indicate the direction in which labels feed into laser printer 56.

An illustrative method of preparing small sets of labels from label sheet 20 is as follows. The user divides label sheet 20 into quarters along perforation lines 30 and 32, such that subsections 22–28 are separated from each other. The user then adjusts manual feed guides 52 on laser printer paper feed tray 54 to accommodate the non-conventional width of an individual subsection of label sheet 20. The user inserts a subsection of the label sheet into the manual feed guide, then sends a print command to the laser printer 56 to initiate printing.

Figure 5:
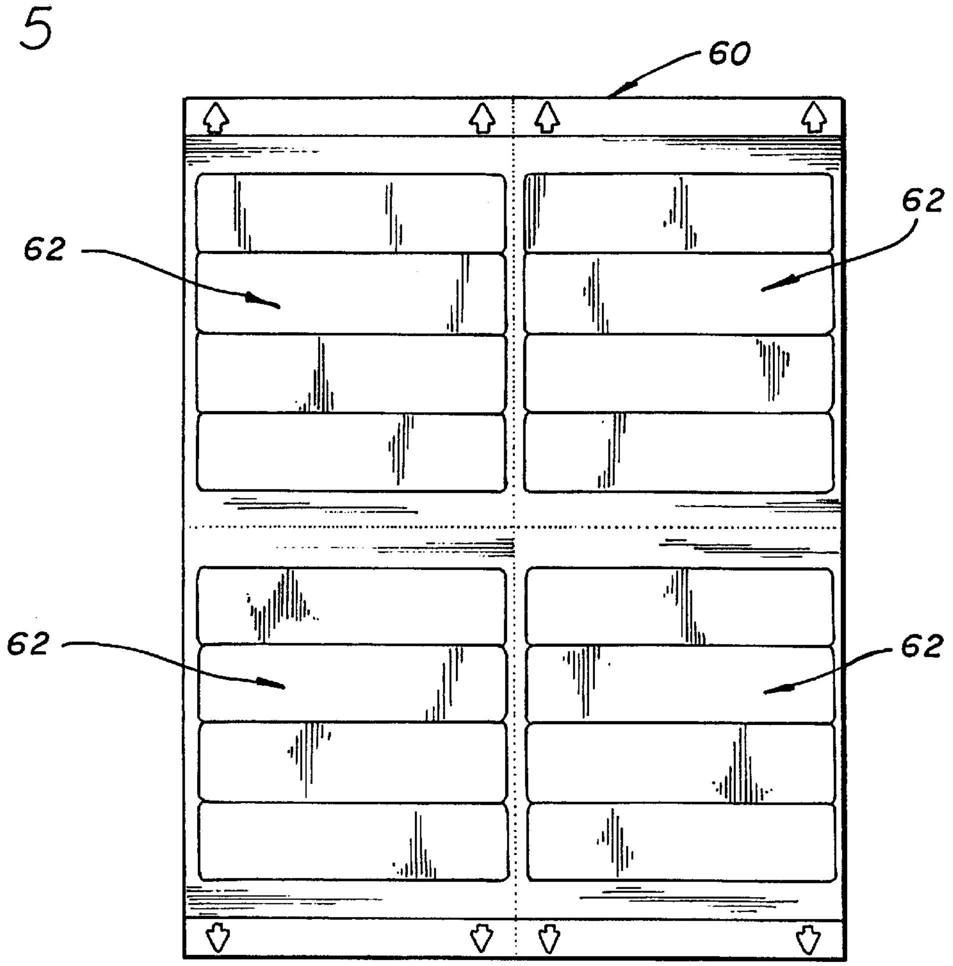
FIG. 5 is a top perspective view showing a full-sized sheet having four separable sections each having four wide labels.

FIGS. 5 and 6 illustrate alternative embodiments of the present invention. FIG. 5 illustrates a label sheet 60 having label sets 62. Each of these label sets 62 feature four labels that are considerably wider than the four labels of label set 34 of FIG. 1. Similarly, FIG. 6 illustrates a label sheet 64 having label sets 66 with three, rather than four, labels per subsection. In FIG. 6, increased flexibility is provided by the perforation lines 40' and 42' which serve substantially the same function as the die cut lines 40 and 42 of FIG. 1.

FIG. 7 illustrates a divisible label assembly having dimensions of between approximately 3 and 5 inches wide by approximately 10 or 11 inches long. For a two-sheet assembly, these ranges help ensure that each subsheet will individually satisfy the minimum dimension requirements of at least some popular laser and ink jet printers. However, it should be noted that minimum dimension requirements have been falling as printer technology has evolved. Consequently, the embodiment of FIG. 7 may have dimensions smaller 3 inches wide and 10 inches long.

More generally, the assembly of FIG. 7 may be at least approximately 3 inches wide by at least approximately 8 inches long to provide sufficient space on each subsection for one big label or several smaller die-cut labels. A convenient assembly size for the embodiment of FIG. 7 is approximately 4¼ inches wide by 10 or 11 inches long, and is presently considered the preferred dimension of such an assembly.

Line of microperforations 132 is located on a line of symmetry of the label assembly. Line of perforations 132 extends through both the label layer 146 and the backing layer 148. Line of microperforations 132 separates the assembly into two subsheets 122, 124, which are mirror images of each other.

Subsheet 122 has a leading edge 136, while subsheet 124 has a leading edge 138. A die cut 140 extends across most of the width of subsection 122 to provide flexibility as subsection 122 feeds into the complex printer feed path of a laser or ink jet printer. Die cut line 140 is inset from the very edge of the leading edge area 136 by about ½-inch. Similarly, subsection 124 has a die cut flexibility line 142 which is inset approximately ½-inch from the very edge of leading edge 138.

As seen in FIG. 7, die cut lines 140, 142 serve the dual function of providing flexibility and defining one edge of a label. Subsection 122 includes label set 134, while subsection 124 includes label set 135. Both label sets are typically die cut, although they may alternatively be cut with laser cutters or water jets. FIG. 8 illustrates that the die cuts defining the labels extend through label layer 146, but do not extend through backing layer 148. It might be noted that any of the transverse die cut lines shown in FIG. 7 may be considered lines of flexibility.

The concept of providing a standard sized sheet that can be broken down into subsections for printing in a laser printer can be extended beyond use with only labels. For instance, a standard sized sheet of card stock can be perforated to form several subsections, each having a set of separable business cards or 3 inch by 5 inch index cards rather than labels. With business cards normally having a size of 3½ inches by 2 inches, a plurality of business cards could be mounted on each mini-sheet.

To print only one or just a few cards at a time, the standard sized sheet may be broken down into the subsections, which are then fed through the manual feed guides and into the laser printer. Such sheets may have increased flexibility at the feed edges thereof by providing a perforation line similar in location to lines 40 and 42 of FIG. 1, although not necessarily extending fully across the width of the subsections. With card stock greater than about 0.007 inch thick or about 7 mils, it is preferable to have a line of perforations, either partial or full, extending along the leading edge of the mini-sheet, about ½-inch from the edge, to provide the desired increased flexibility.

FIG. 9 illustrates a further embodiment of the present invention. A single layer sheet of card stock is divided by a line of microperforations 232 into two identical sections. Each section 236, 238 includes a closed pattern of perforations to define a removable card. FIG. 9 shows one removable card 235 associated with subsection 224, and a second card 234 associated with subsection 222. Each subsection includes a line of perforations inset from and running parallel to a leading edge. Thus, FIG. 9 illustrates a line of perforations 142 inset approximately ½-inch from the very edge of leading edge 238. Similarly, a line of microperforations 140 runs parallel to the very edge of leading edge 236. Both lines of perforation 240, 242 provide flexibility to the card stock at the leading edge to prevent the card stock from jamming within the printer. It has been determined that card stock having a thickness of greater than about 7 mils will tend to jam in the feed path of most laser printers. Consequently, lines of perforation such as 240, 242 are necessary to prevent such embodiments from jamming in the laser printer. However, it should be noted that card assemblies having a thickness of 7 mils or less do not generally need lines of flexibility such as 240, 242.

Although not illustrated in the present figures, an embodiment such as FIG. 9 for printing cards may include an adhesively coated piece of transparent plastic lamination which is coextensive with and which adheres to the top surface of the card stock. The card stock may be coated on the top with a release coating in areas so that the lamination may be removed from those areas. However, at the top surface of the card, there would be no release coating. A user may print indicia on the lower surface of the card stock, then detach the card along the lines of perforation from the card stock. The user also removes the lamination from the release-coated areas of the upper surface of the assembly. The user then folds the lamination over about the removed card to laminate the card. The user may then trim any excess lamination with scissors, or the lamination may be sized such that no trimming is necessary.

As other alternatives, the cards of FIG. 9 may have various shapes, for example, the cards may be shaped to have ears which may be inserted into slots in hanging file folders. The user prints indicia on the card, punches the card out of the assembly along the lines of perforation, then inserts the ears of the card into the hanging file folder slots. As yet another alternative, a lamination/card set such as that described above may be shaped such that the lamination strip may be folded about the card with excess length of lamination extending beyond the length of the card on both the front and back. This then defines a self-adhering index tab which may be applied to the page of notebook or other member. Numerous other uses may be implemented for this card embodiment. In general, it is anticipated that the sheet of card stock for these embodiments will be between 7 and 10 mils thick. However, thinner sheets may also be used, including sheets of paper.

The embodiment illustrated in FIG. 9 may be modified such that there are a plurality of individual smaller cards on one or both of the subsections. So, for instance, 20 or more rectangular index tab insert cards can be defined by a pattern of microperforations on one or both of the subsections.

It should be noted that a variety of labels and other products have been previously provided for use in dot matrix printers. Generally speaking, these products include tractor feed holes arranged in a spaced relationship along the sides of the assemblies. However, these tractor feed holes are not appropriate for use in laser printers, ink jet printers, and photocopiers, all of which generally require a substantially flat and aperture free sheet. Consequently, the various embodiments of the present invention generally are substantially flat on both their upper and lower surfaces and have no open apertures, such as tractor feed holes.

One embodiment of the present invention is a divisible sheet of labels having a transparent paper or transparent film label sheet having an adhesive coating and being adhered to a backing sheet. The labels are die cut or otherwise cut from the transparent paper or transparent film sheet. The backing sheet is generally coated with a release coating to facilitate convenient removal of the labels. One suitable transparent paper is Gateway Natural Tracing Paper, manufactured by Chartham Paper Mill, Canterbury, Kent, England. In embodiments incorporating plastic films, a polyester film having a print-receptive surface may be used. Suitable plastic films are available from Protect-All, Inc. of Darien, Wis. Coatings to enhance print receptivity are available from Precision Coatings, Inc. of Walled Lake, Mich.

By way of example and not of limitation, the embodiment of FIG. 1 may have the following dimensions. Label sheet 20 may be a standard 8½ by 11 inch sheet. Leading edge portion 36 may be ½-inch long. Each subsection may be 4 inches wide by 5½ inches long. Each label may be 2½ inches wide by 1 inch long. Each label set 34 may be centered within a subsection, with a ½-inch border at the top and bottom and a ¾ inch border along either side. Of course, these dimensions may be substantially varied without departing from the scope of the invention.

As a further example, the embodiment of FIG. 7 may be 4¼ inches wide by 10 or 11 inches long. Each subsection may therefore be 4¼ inches wide by 5 or 5½ inches long, which is a convenient size for printing small numbers of labels.

The microperforations of FIG. 7 are shown somewhat enlarged for clarity of illustration. As noted earlier, microperforations generally have at least 35 cuts and ties per inch. The assembly of FIG. 7 may be approximately 5 to 10 mils thick, with the label layer having an approximate thickness of 4 to 6 mils, the adhesive layer being on the order of 1 mil thick, the release coating on the backing sheet being less than 1 mil thick, and the backing sheet being approximately 2 or 3 mils thick. In general, the assembly should be no more than 15 mils thick to properly print in a laser printer. The foregoing dimensions are merely illustrative and greater or lesser thicknesses may be employed for particular applications, and the backing sheet may be of the same material as the top sheet.

It should be noted that with respect to embodiments of the present invention for printing cards, the card stock sheet may generally be as thick as 8 mils without needing to have a line of perforations inset from the leading edge to prevent jamming in the printer. It is anticipated that most card embodiments will be between 7 and 10 mils thick. In some embodiments greater than 8 mils thick, it is presently preferred to space a line of flexibility perforations approximately ½-inch from the leading edge to avoid jamming in the complex paper feed path of many laser printers and photocopiers.

With respect to the dimensions of embodiments of the present invention, modern-day laser printers generally will not print sheet sizes less than approximately 3 inches wide or less than approximately 5 inches long. However, printer technology is constantly evolving. Consequently, the present invention is not limited to these dimensions. As printers are developed that will accept sheet sizes narrower than 3 inches and/or shorter than 5 inches, the minimum dimensions of embodiments of the present invention may decrease accordingly.

Similarly, the minimum thickness of the present invention may increase as printers evolve to accept sheets that are thicker than approximately 15 mils, and the maximum width may be increased beyond 8½ inches. Additionally, new types of printers other than laser printers, ink jet printers and photocopiers may be developed in the future. Accordingly, the assemblies of the present invention are not limited to use in presently popular printers, but may be used in future types printers that will print onto subsections of a larger label or sheet assembly.

In conclusion, it is to be understood that the foregoing detailed description and the accompanying drawings relate to presently preferred embodiments of the invention. Various changes and modifications may be made without departing from the spirit and scope of the invention. Thus, by way of example and not of limitation, each subsection may have any number of labels other than the three or four labels per subsection shown in the drawings. Indeed, the entire subsection could be a single large label. Similarly, the individual labels may have any of a variety of shapes, including triangular, circular, polygonal, and so on. The full size sheets may be legal sized, may be A4 size paper, or any other desired size, such as 9 inch long paper or other non-standard size sheets.

Although the embodiments described herein have featured four or two subsections, various other arrangements of subsections are possible. For instance, a label sheet may have six subsections, with three subsections on the top of the sheet and another three on the bottom of the sheet. Alternatively, the sheet could be divided into three or more narrow subsections rather than two.

Other variations are also apparent. To increase flexibility, the lines of flexibility can be perforated instead of being die cut. The perforations may extend through just the label layer and not the backing layer, or may extend through both.

If a user wishes to print more than a single subsection at once, he or she need not break the full sheet into all of the possible subsections, but can print two or more adjoining subsections at the same time. The user can even put whole sheets of labels in paper tray for automatic feeding if the user wants to print several labels at once.

The backing sheet in the double-thickness sheet embodiments is not necessarily coextensive with the upper sheet which is to be printed. Thus, for example, if the pressure sensitive adhesive is only applied to a portion of the upper sheet, the backing sheet need only cover the adhesive-covered portion of the upper sheet, and the upper sheet would be folded over to provide the backing sheet.

Accordingly, the present invention is not limited to the specific embodiments shown in the figures and described in the detailed description.

What is claimed is:

1. A method for printing multiple purpose, double thickness label sheet assembly comprising the steps of:

constructing a plurality of label assemblies each comprising:

a backing sheet having pre-defined dimensions and an upper surface;

a label sheet having a pressure sensitive adhesive coating thereon mounted on said upper surface of said backing sheet, with the adhesive facing the backing sheet, said label sheet covering substantially all of said upper surface of said backing sheet;

said double thickness label sheet assembly being divided into only two sections having substantially equal dimensions by microperforations extending through both said label sheet and said backing sheet;

said label sheet having a flexible top leading edge and a flexible bottom leading edge, said label sheet having a first die-cut flexibility line cut into said label sheet approximately ½ inch from said top leading edge and a second die-cut flexibility line cut into said label sheets approximately ½ inch from said bottom leading edge, said flexibility lines allowing said leading edges to easily bend around the twists and turns in a conventional printer feed path;

each of said sections having a plurality of die cut labels thereon, with the die cuts extending through said label sheet but not through said backing sheet;

said label sheet being substantially coextensive with said backing sheet;

said label sheet being sufficiently large to be fed into a printer; and each of said sections being sufficiently large to individually meet the minimum dimension requirements of at least some printers and being at least 3 inches by 5 inches in dimension;

wherein said first die-cut flexibility line comprises an edge of one of said die cut labels, and said second die-cut flexibility line comprises one edge of another of said die cut labels;

whereby said double thickness label sheet assembly may be printed in its entirety by a printer, or may be divided along said microperforations into sections which each have a flexible leading edge for individual feeding into and printing by a printer, and said microperforations leave substantially smooth edges when said sections are separated from one another;

separating one section from one of said label sheet assemblies along said microperforations;

after separating one section from said label sheet, printing said one section in an office printer.

2. A method as defined in claim 1, wherein said label sheet is transparent paper.

3. A method as defined in claim 1, wherein the method further comprises:

after printing said on section in an office printer, storing the other section for later printing.

4. A method as defined in claim 1, wherein said label sheet assembly has dimensions of approximately 4¼ inches wide by 10 inches long.

5. A method as defined in claim 1, wherein each individual section includes indicia indicating instructions for feeding the individual section through a printer.

6. A method for printing small-sized, multiple purpose, double thickness label sheet assembly comprising the steps of:

constructing a plurality of label assemblies each comprising:

a backing sheet having pre-defined dimensions and an upper surface;

a label sheet having a pressure sensitive adhesive coating thereon removably mounted on said upper surface of said backing sheet, with the adhesive facing the backing sheet, said label sheet covering substantially all of said upper surface of said backing sheet;

said double thickness label sheet assembly being divided into only two sections having substantially equal dimensions by microperforations extending through both said label sheet and said backing sheet;

said label sheet having a flexible top leading edge and a flexible bottom leading edge, said label sheet having a first die-cut flexibility line cut into said label sheet approximately ½ inch from said top leading edge and a second die-cut flexibility line cut into said label sheets approximately ½ inch from said bottom leading edge, said flexibility lines allowing said leading edges to easily bend around the twists and turns in a conventional laser printer feed path;

each of said sections having a plurality of die cut labels thereon, with the die cuts extending through said label sheet but not through said backing sheet;

said label sheet being substantially coextensive with said backing sheet;

said label sheet being sufficiently large to be fed into a laser printer but having dimensions of no greater than approximately 5 inches by 11 inches; and each of said sections being sufficiently large to individually meet the minimum dimension requirements of at least some laser printers and being at least 3 inches by 5 inches in dimension;

wherein said first die-cut flexibility line comprises an edge of one of said die cut labels, and said second die-cut flexibility line comprises one edge of another of said die cut labels;

whereby said double thickness label sheet assembly may be printed in its entirety by a laser printer, or may be divided along said microperforations into sections which each have a flexible leading edge for individual feeding into and printing by a laser printer, and said microperforations leave substantially smooth edges when said sections are separated from one another;

separating one section from one of said label sheet assemblies along said microperforations; and after separating one section from said label sheet, printing said one section in an office printer.

7. A method as defined in claim 6, wherein said label sheet is transparent paper.

8. A method as defined in claim 6, wherein the method further comprises the steps of:

printing at least one of said label sheets whole; and after printing at least one of said label sheets whole, dividing said at least one label sheet along said microperforations into individual sections.

9. A method as defined in claim 6, wherein after the step of printing said one section in an office printer the method further comprises the step of storing the other section for later printing.

10. A method as defined in claim 6, wherein said label sheet assembly has dimensions of approximately 4¼ inches wide by 10 inches long.

11. A method for printing multiple purpose, double thickness label sheet assemblies comprising the steps of:

constructing a plurality of label assemblies each comprising:

a backing sheet having pre-defined dimensions and an upper surface;

a label sheet having a pressure sensitive adhesive coating thereon mounted on said upper surface of said backing sheet, with the adhesive facing the backing sheet, said label sheet covering substantially all of said upper surface of said backing sheet;

said double thickness label sheet assembly being divided into sections by perforations extending through both said label sheet and said backing sheet;

said label sheet being substantially coextensive with said backing sheet;

said label sheet being sufficiently large to be fed as a whole into a printer; and each of said sections being sufficiently large to individually meet the minimum dimension requirements of at least some office printers;

whereby said double thickness label sheet assembly may be printed in its entirety by an office printer, or may be divided along said perforations into sections for individual feeding into and printing by an office printer;

separating one section from one of said label sheet assemblies along said perforations;

after separating one section from said label sheet, printing said one section in an office printer;

printing another of said label sheet assemblies as a whole in an office printer;

wherein a user divides some of said label sheet assemblies before printing for small printing jobs, and prints others of said label sheet assemblies as a whole for larger printing jobs.

12. A method as defined in claim 11, wherein said label sheet is transparent paper.

13. A method as defined in claim 11, wherein said assembly has only two sections that are each substantially the same size as the other.

14. A method as defined in claim 13, wherein said only two sections are divided from one another by a line of microperforations.

15. A method as defined in claim 11 wherein said label sheet has dimensions of no greater than approximately 5 inches by 11 inches.

* * * * *